(12) United States Patent
Mehfuz et al.

(10) Patent No.: US 10,170,140 B2
(45) Date of Patent: Jan. 1, 2019

(54) WAVEGUIDE HAVING MODE CONVERTER FOR HEAT-ASSISTED MAGNETIC RECORDING DEVICE

(71) Applicant: Seagate Technology LLC, Cupertino, CA (US)

(72) Inventors: Reyad Mehfuz, Derry (GB); Aidan Dominic Goggin, Donegal (IE); Kelly Elizabeth Hamilton, Derry (GB); John Bernard McGurk, Derry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/412,144

(22) Filed: Jan. 23, 2017

(65) Prior Publication Data

US 2018/0211685 A1 Jul. 26, 2018

(51) Int. Cl.
| | | |
|---|---|---|
| *G11B 11/00* | (2006.01) | |
| *G11B 5/48* | (2006.01) | |
| *G02B 6/14* | (2006.01) | |
| *G02B 6/125* | (2006.01) | |
| *G11B 5/00* | (2006.01) | |
| *G11B 5/60* | (2006.01) | |

(52) U.S. Cl.
CPC ............ *G11B 5/4866* (2013.01); *G02B 6/125* (2013.01); *G02B 6/14* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 2,914,741 A | 11/1959 | Unger | |
| 5,200,939 A | 4/1993 | Nishiwaki et al. | |
| 8,731,350 B1 * | 5/2014 | Lin | G02B 6/124 359/337.21 |
| 9,424,867 B2 | 8/2016 | Peng | |
| 9,659,591 B1 * | 5/2017 | Peng | G11B 5/4866 |
| 2005/0018949 A1 | 1/2005 | Yan | |
| 2011/0243176 A1 * | 10/2011 | Mooney | G11B 5/105 372/50.124 |
| 2014/0254335 A1 * | 9/2014 | Gage | G11B 5/6088 369/13.33 |

(Continued)

*Primary Examiner* — Tan X Dinh
(74) *Attorney, Agent, or Firm* — Hollingsworth Davis, LLC

(57) ABSTRACT

A write head comprises a waveguide core configured to receive light emitted in a crosstrack direction from a light source at a fundamental transverse electric ($TE_{00}$) mode. The waveguide core comprises a first turn that receives the light in the crosstrack direction redirects the light to an opposite crosstrack direction and a second turn that redirects the light to a direction normal to a media-facing surface of the write head. The waveguide core comprises a straight section that couples the first and second turns and a branched portion extending from the straight section. The branched portion is configured to convert the light to a higher-order ($TE_{10}$) mode. A near-field transducer at the media-facing surface is configured to receive the light at the $TE_{10}$ mode from the waveguide and directs surface plasmons to a recording medium in response thereto.

20 Claims, 16 Drawing Sheets

(56) References Cited

U.S. PATENT DOCUMENTS

| | | | | |
|---|---|---|---|---|
| 2014/0293761 A1* | 10/2014 | Jin | ........................ | G02B 6/105 369/13.29 |
| 2015/0131415 A1* | 5/2015 | Peng | .................... | G11B 5/1278 369/13.32 |
| 2015/0279394 A1* | 10/2015 | Peng | .................... | G11B 5/6088 385/28 |
| 2016/0133285 A1* | 5/2016 | Peng | .................... | G02B 6/1226 369/13.33 |
| 2016/0195676 A1* | 7/2016 | Yu | ........................ | G02B 6/1226 385/11 |
| 2016/0247525 A1* | 8/2016 | Lee | ........................ | G11B 5/314 |
| 2017/0084299 A1* | 3/2017 | Peng | .................... | G02B 6/1228 |
| 2017/0125048 A1* | 5/2017 | Peng | .................... | G11B 5/4866 |
| 2017/0249962 A1* | 8/2017 | Peng | .................... | G11B 5/4866 369/13.33 |
| 2017/0256277 A1* | 9/2017 | Peng | .................... | G11B 5/4866 369/13.33 |

\* cited by examiner

WAVEGUIDE HAVING MODE CONVERTER FOR HEAT-ASSISTED MAGNETIC RECORDING DEVICE

SUMMARY

Embodiments described herein are directed to a write head comprising a waveguide core configured to receive light emitted in a crosstrack direction from a light source at a fundamental transverse electric ($TE_{00}$) mode. The waveguide core comprises a first turn that receives the light in the crosstrack direction redirects the light to an opposite crosstrack direction and a second turn that redirects the light to a direction normal to a media-facing surface of the write head. The waveguide core comprises a straight section that couples the first and second turns and a branched portion extending from the straight section. The branched portion is configured to convert the light in to a higher-order ($TE_{10}$) mode. A near-field transducer at the media-facing surface is configured to receive the light at the $TE_{10}$ mode from the waveguide and directs surface plasmons to a recording medium in response thereto.

Embodiments described herein comprise a light source comprising an active region formed a non-self supporting, crystalline layer transfer printed to a substrate. An input coupler is configured to-receive light excited by the light source. A waveguide core extends along a light-propagation direction and is configured to receive light from the light source at a fundamental transverse electric ($TE_{00}$) mode. The waveguide core comprises a main portion having a curvature that changes linearly with curve length and is configured to receive light at an input, and a branched portion extending from a middle region of the main portion. A near-field transducer at a media-facing surface of the write head is configured to receive the light at a $TE_{10}$ mode from the waveguide and direct surface plasmons to a recording medium in response thereto.

Embodiments are directed to a method comprising receiving light emitted in a crosstrack direction from a light source at a fundamental transverse electric ($TE_{00}$) mode. Light is redirected to an opposite crosstrack direction into a straight section of a waveguide via a first turn of the waveguide. Light is converted to a higher-order ($TE_{10}$) mode via a branched portion that extends from the straight section of the waveguide. Light is redirected to a direction normal to a media-facing surface of the write head via a second turn of the waveguide, the second turn coupled to the straight section. Light in the $TE_{10}$ mode is coupled to a near-field transducer at the media-facing surface. The near-field transducer directs surface plasmons to a recording medium in response thereto.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally related to an apparatus (e.g., a HAMR write head) having a waveguide that delivers light from an energy source (e.g., laser diode) to a near-field transducer (NFT). The NFT may also be referred to as a plasmonic transducer, plasmonic antenna, near-field antenna, nano-disk, nan-patch, nano-rod, etc. The light generates a surface plasmon field on the NFT, and the surface plasmons are directed out of a surface of the write head onto a magnetic recording medium. This creates a hotspot on the recording medium, lowering its magnetic coercivity and enabling a local magnetic field generated by a write pole to write data to the hotspot.

Figure 1A:
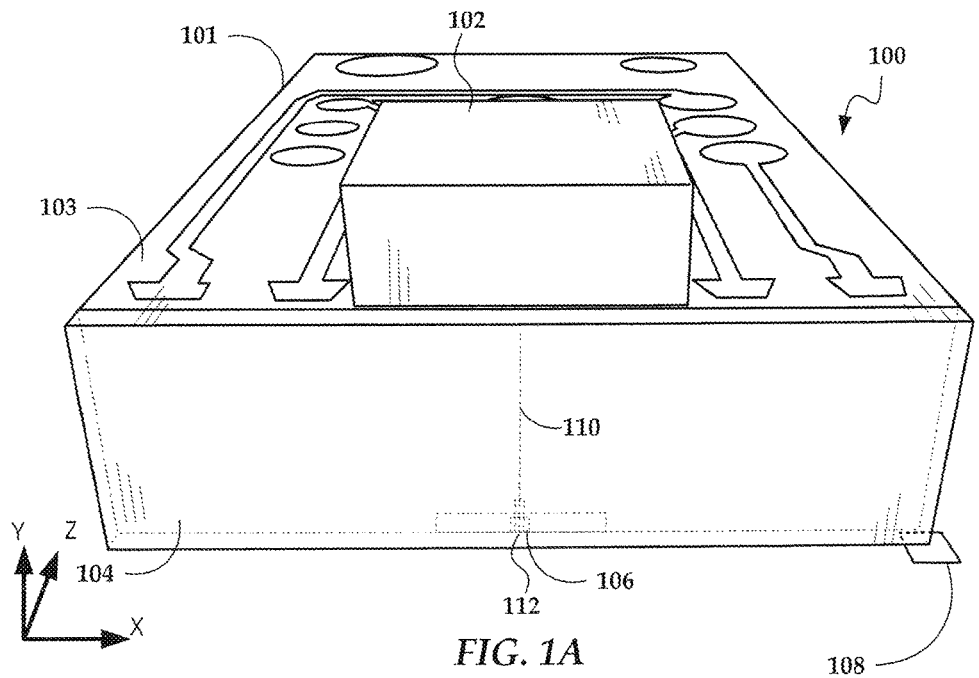
FIGS. 1A and 1B are a perspective views of hard drive sliders that includes a waveguide in accordance with embodiments described herein.

In reference to FIG. 1A, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., in a pocket or cavity) such that the light is emitted in a direction perpendicular to the media-facing surface (along the negative y-direction in this view).

Figure 1B:
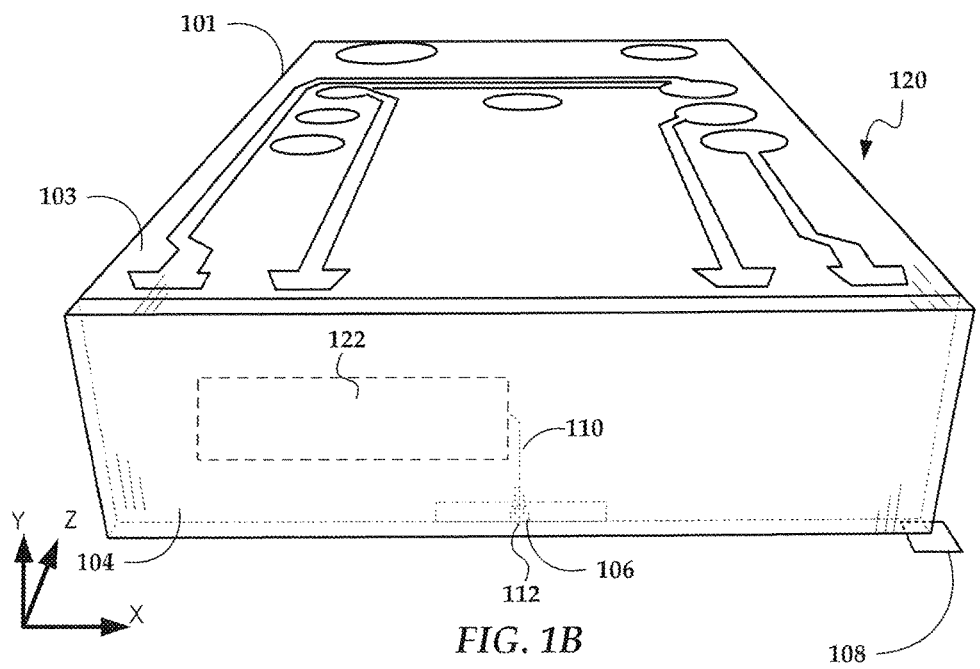

In the present disclosure, hard drive recording heads may use a different type of laser than what is shown in FIG. 1A. A read/write head 120 using this alternate approach is shown in FIG. 1B, wherein components are given the same reference numbers as analogous components in FIG. 1A. At least part of a semiconductor laser 122 or material to form a laser (e.g., epitaxial layer) is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment. Carrying the semiconductor laser 122 with the read/write head substrate, without a separate or intermediate support substrate, can help to reduce the size and simplify the shape and connection methods, and it can also allow for the use of laser geometries and designs that are very different from simple edge-emitting cleaved facet lasers that have been proposed in the past.

In at least some cases, parts of the laser 122 (e.g., GaAs active region) are incompatible with epitaxial growth on the target substrate of a slider, which may be formed of a dielectric such as alumina. As such, the laser 122 cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked etched, further layers added) to form the integrated laser diode unit 122. This process of transferring non-self-supporting layers of epitaxial-growth-incompatible layers is referred to herein as On-Wafer Laser (OWL) process integration. This process may also be referred to as transfer printing, dry transfer printing, nanoprinting, etc. Embodiments described herein may be implemented in an OWL system.

The waveguide system 110 discussed herein and shown in FIGS. 1A and 1B may be applicable to any type of light delivery configuration. For example, a laser may be mounted on the trailing edge surface 104 instead of the top surface 103. In another configuration known as free-space light delivery, a laser may be mounted external to the write head 100, and coupled to the slider by way of optic fiber and/or waveguide. An input surface of the slider body 101 may include a grating or other coupling feature to receive light from the laser via the optic fiber and/or waveguide.

Figure 2:
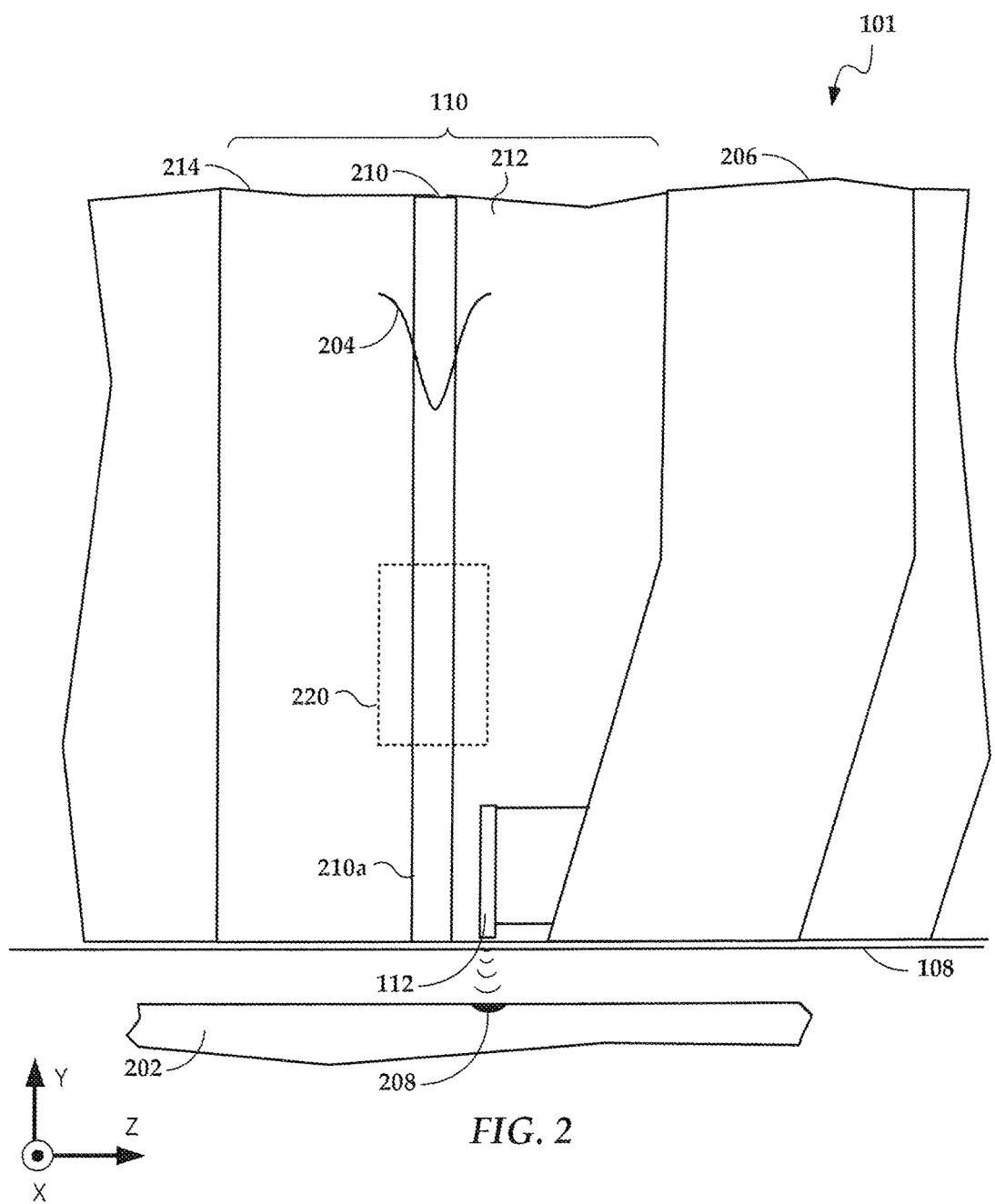
FIG. 2 is a cross-sectional view shows details of a HAMR apparatus according to various implementations.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hot spot 208 on the recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the downtrack direction (z-direction).

The waveguide system 110 includes a core layer 210 surrounded by cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, $Si_3N_4$, $Nb_2O_5$, AlN, $Hf_2O_3$, $Y_2O_3$, GaP, SiC, Si, etc. Generally, the dielectric materials are selected so that the refractive index of the core layer 210 is higher than refractive indices of the cladding layers 212, 214. This arrangement of materials facilitates efficient propagation of light through the waveguide system 110.

A first end of the core 210 (not shown) extends along the crosstrack direction (negative x-direction) where it is directly or indirectly coupled to a light/energy source. For example, a laser diode (e.g., OWL laser diode) may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy 204 coupled into the first end of the waveguide core 210 propagates to a second end 210a that is proximate the near-field transducer.

Figure 3A:
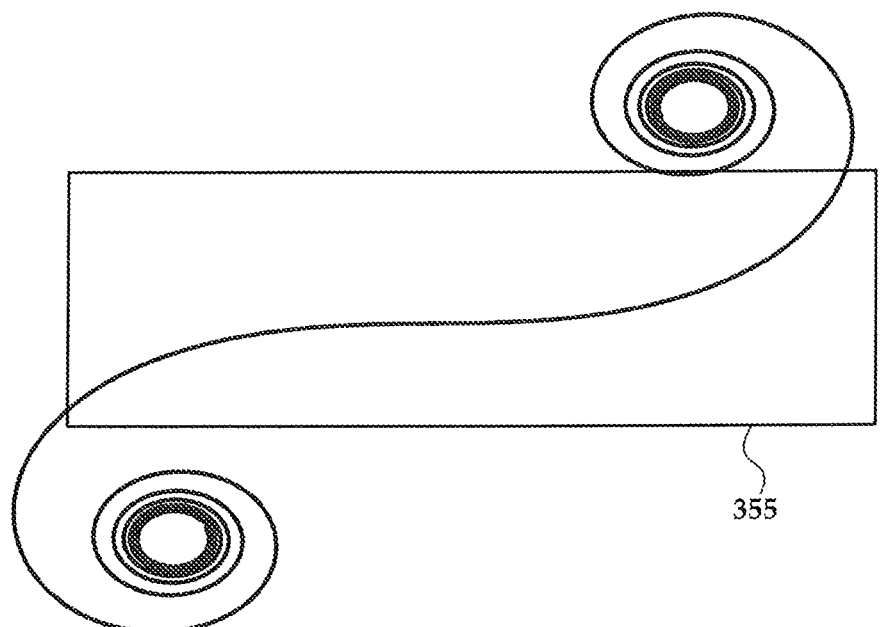
FIGS. 3A and 3B show an Euler spiral that can be used to form a waveguide core in accordance with various embodiments.

In this example, the energy 204 is coupled into the waveguide 110 at a fundamental transverse electric ($TE_{00}$) mode. According to various embodiments, using a waveguide core shape having a curve where the curve grows linearly with the curve length allows for efficient propagation of light. A mode converter 220 is configured to perform mode conversion from $TE_{00}$ to a higher-order, e.g., $TE_{10}$, mode. For example, a waveguide core that uses at least a portion of an Euler spiral as shown in FIG. 3A may help to facilitate efficient propagation of light as it is changes direction in the waveguide. The Euler spiral may be known as Cornu spiral or a clothoid. An Euler spiral has a curve whose curvature grows linearly with the curve length as represented by Equation 1 where R is the radius of curvature, θ is the angle of the curve from the beginning of the spiral to a particular point on the spiral, and s is the length of the spiral measured along the spiral from its initial position.

$$\frac{1}{R} = \frac{d\theta}{ds} \propto S \qquad \text{Equation 1}$$

Figure 3B:
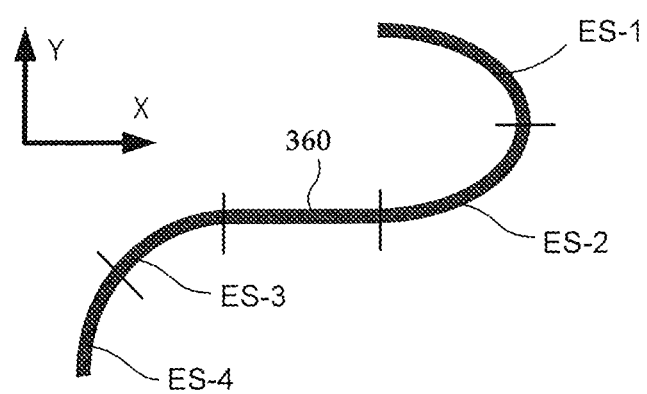

FIG. 3A illustrates a basic Euler spiral and the area of interest 355 for mode conversion. The final structure of the Euler spiral portion of a waveguide is shown in FIG. 3B. The waveguide includes first and second Euler spiral portions ES-1, ES-2 that are mirrors of one another along the x-axis, which corresponds to the crosstrack direction of the slider. The sections ES-1 and ES-2 form a first turn of the waveguide that cause the light to change directions in an opposite direction, or about 180 degrees in the crosstrack direction. Euler curves ES-3 and ES4 form a second turn that changes the light direction about 90 degrees for coupling to the NFT. The ES-4 section is tangent-matched to ES-3. A straight waveguide section 360 couples the first and second turns. As will be described below, a mode-converter is located along the straight waveguide section.

Figure 4A:
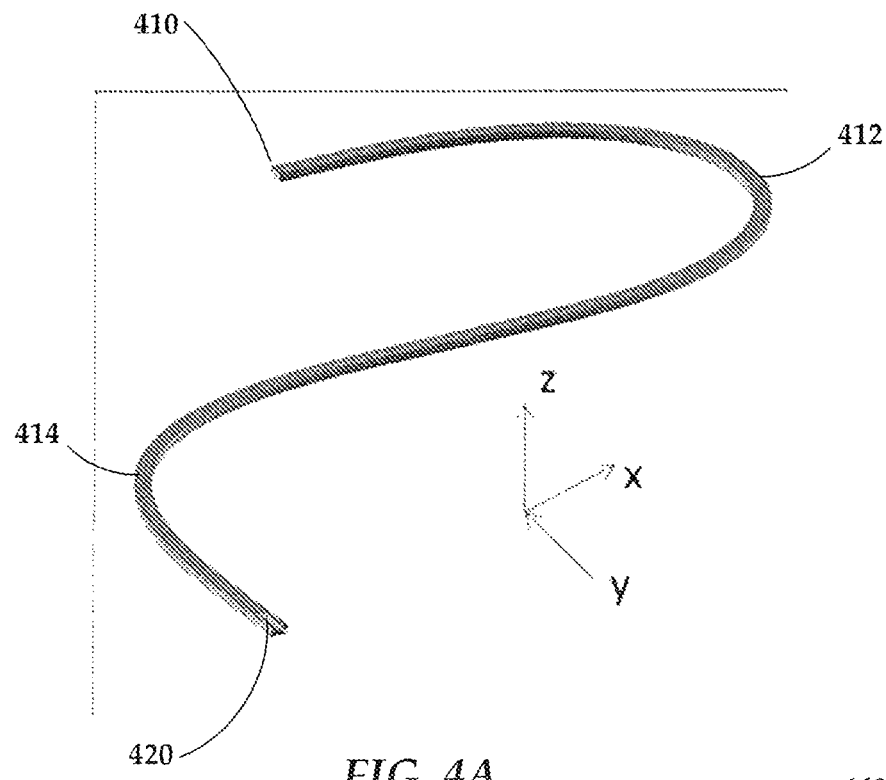
FIGS. 4A, 4B, and 4C illustrate a waveguide core from different perspectives according to some aspects.
Figure 4B:
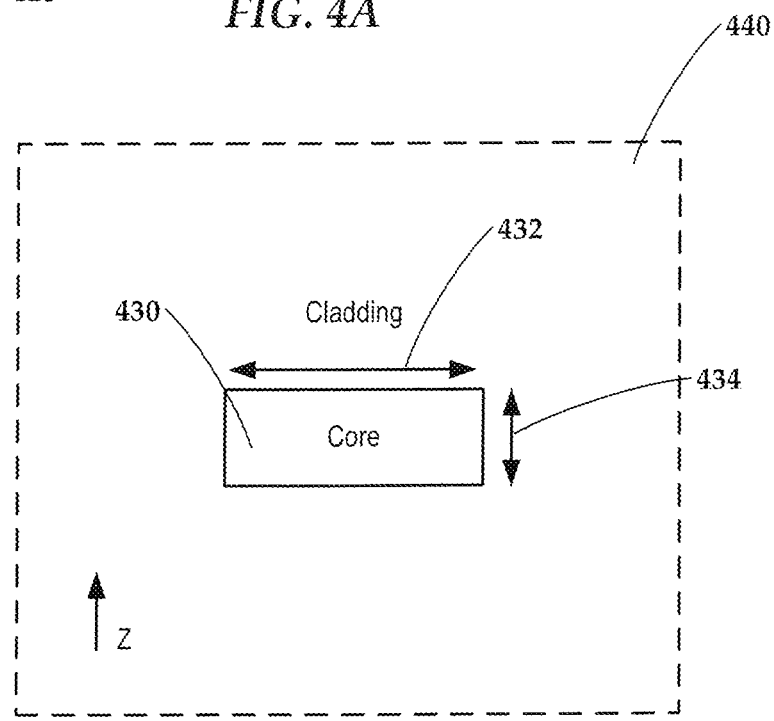
Figure 4C:
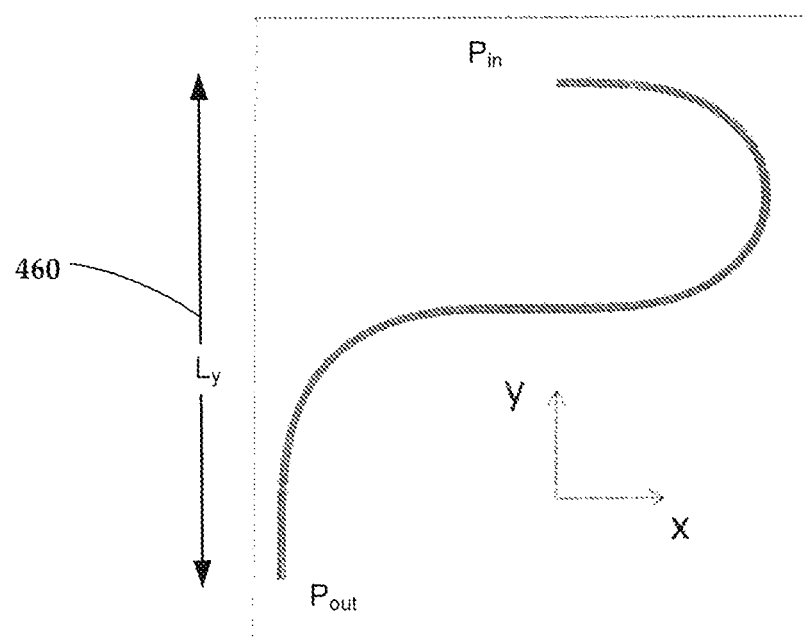

FIGS. 4A, 4B, and 4C illustrate a waveguide core from different perspectives. FIG. 4A show a waveguide core having a curve (e.g., Euler spiral) that grows linearly with curve length in accordance with embodiments described herein. Light enters the waveguide at input location 410 in a $TE_{00}$ mode and exits the waveguide core in a $TE_{10}$ mode at location 420. At location 410, the waveguide core is receives light from a laser diode that is emitted in a crosstrack direction (x-direction) and has a 180 degree turn 412 that redirects the light in the opposite crosstrack direction. A second turn 414 directs the light normal to the media-facing surface of the read/write head where it is coupled to an NFT. According to various implementations, the waveguide core 430 is surrounded by cladding layers 440 in all directions as shown by FIG. 4B. The waveguide core may have a higher index of refraction than the surrounding cladding layers. In some cases, the waveguide core comprises $NbO_x$, BTO, and/or $TaO_x$. There may be more than one cladding layer having the same or different indices of refraction from the other cladding layers. According to various embodiments, one or more of the cladding layers comprises $SiO_2$. The waveguide core 430 may have a first dimension 432 of about 550 nm and a second dimension 434 of about 120 nm, for example. FIG. 4C shows another perspective of the waveguide. Dimension 460 Lv represents the height of the mode conversion region of the waveguide. In some cases, Lv is about 75-80 μm, for example.

Figure 5A:
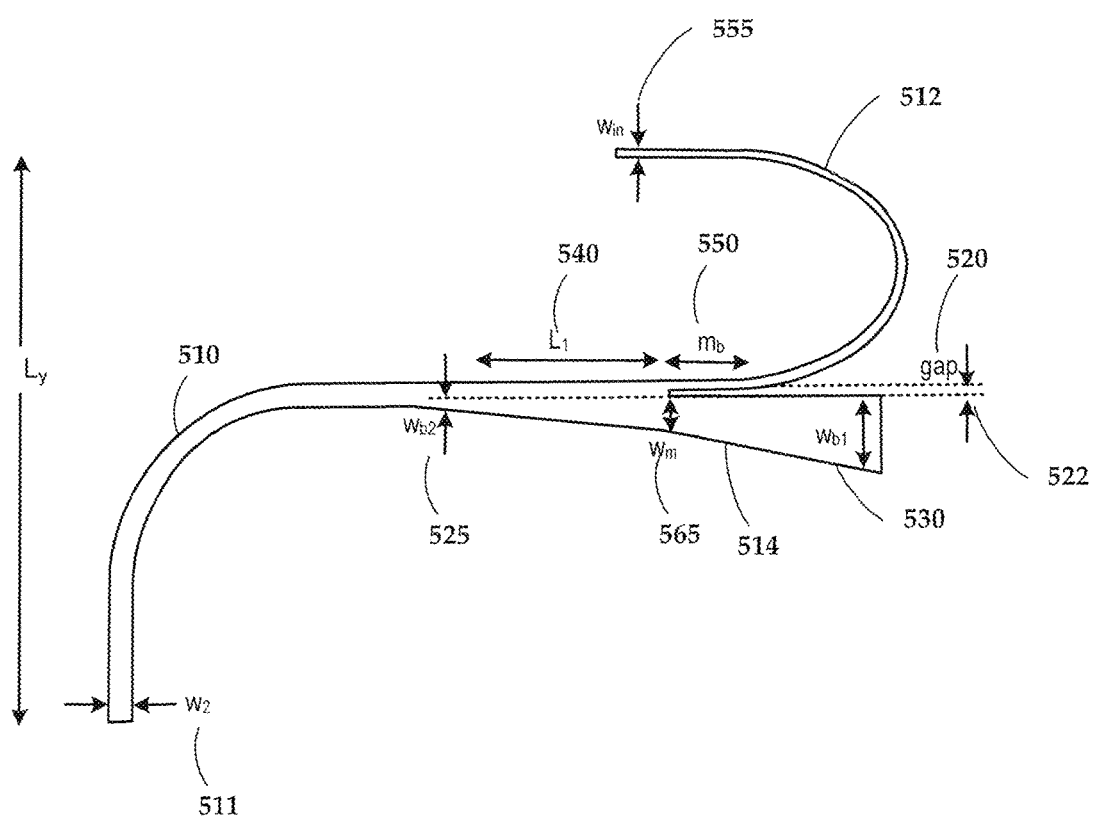
FIG. 5A illustrate various dimensions of a waveguide having a curve that increases linearly along the length of the waveguide in accordance with embodiments described herein.

FIG. 5A illustrates a waveguide having a curve that increases linearly along the length of the waveguide in accordance with embodiments described herein. The waveguide includes a main branch 512 configured to receive light. Light may be input into the waveguide system in a $TE_{00}$ mode. The main branch 512 has a width ($w_{in}$) 555 at the point at which light is input into the system. In some cases, $w_{in}$ 555 remains constant until the main branch 512 combines with a secondary branch 514. In some cases, the width of the main branch 512 varies along the length of the main branch 512. The secondary branch 514 has a starting width ($w_{b1}$) 530 and a width ($w_m$) 565 at a point that the secondary branch 514 combines with the main branch 512. The value of $w_{b1}$ 530 may be the same as $w_m$ 565 or may be a different value than $w_m$ 565 in some cases.

A gap 520 may be disposed between the main branch 512 and the secondary branch 514 as illustrated in FIG. 5A. The various dimensions of the gap 520 may be tuned to achieve a desired and/or a maximum amount of mode conversion from $TE_{00}$ to $TE_{10}$. In some cases, the width 522 of the gap 520 is constant for a predetermined length ($m_b$) 550 as shown in FIG. 5A. The gap 520 may not have a constant width portion (i.e., $m_b$=0) according to various configurations. The width $w_{b2}$ 525 of the secondary branch 514 at the point that the waveguide becomes a combined waveguide may have the same or different value than that of $w_m$ 565 and $w_{b1}$ 530.

The final width ($w_2$) 511 of the combined main branch 512 and the secondary branch 514 may be equal, greater than, or less than the sum of the widths of the main branch 512 and the secondary branch 514. One or both of the main branch 512 and the secondary branch 514 may have a taper to accommodate the change in width of the combined waveguide 510. In the example shown in FIG. 5A, the secondary branch 514 includes a taper that starts at the point where the waveguide branches are combined and continues to taper substantially linearly for a length ($L_1$) 540. In some cases, $L_1$ 540 is about 23 μm. While FIG. 5A shows a linear decreasing taper in the secondary branch 514, it is to be understood that the taper may be nonlinear, may increase and/or may additionally or alternatively include a taper in the main branch 512 of the waveguide.

Figure 5B:
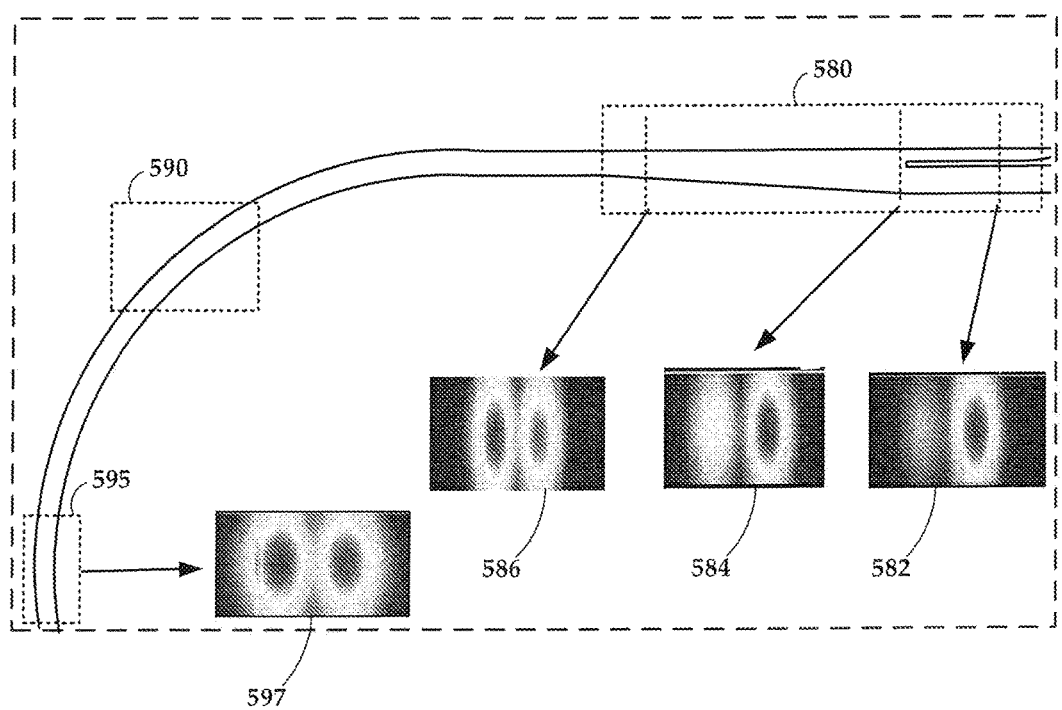
FIG. 5B illustrates field plots at different sections of the mode converting waveguide in accordance with embodiments described herein.

FIG. 5B illustrates field plots at different sections of the mode converting waveguide. At the input section of the waveguide, the light is largely $TE_{00}$ mode. This $TE_{00}$ mode light is input into the first mode converting region 580 as shown in the first field plot 582. The first mode conversion region 580 converts the mode of the light by providing a deliberate phase mismatch between the main branch and the secondary branch of the waveguide in the gap portion of the waveguide. The tapering of the secondary branch of the waveguide provides finer tuning of the phase mismatch to increase the $TE_{10}$ mode purity as shown in the second field plot 584. The light mode distribution output from the first mode converting region of the waveguide is shown in the third field plot 586. The curved mode conversion region 590 provides finer tuning before the light is output in its final mode at 595 as shown in the fourth field plot 597. While, FIGS. 3A-5B illustrate embodiments utilizing a Euler curve in the main branch of the waveguide, it is to be understood that any of the embodiments described herein may be implemented in a system that has a different type of main branch. For example, the main branch may be substantially straight and/or have a curve that is different than an Euler spiral curve.

Figure 6A:
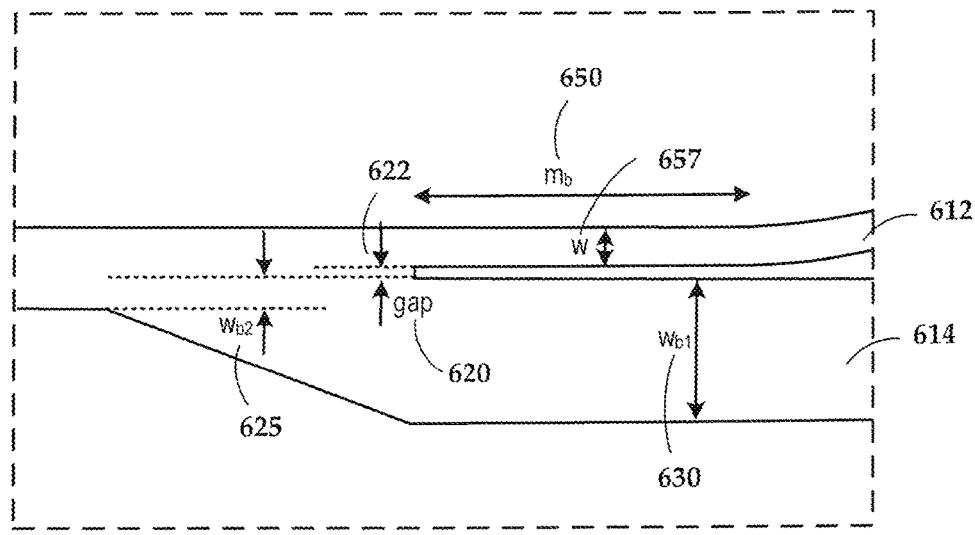
FIG. 6A illustrates a waveguide having a gap in accordance with embodiments described herein.

According to various implementations, the gap between the main branch and the secondary branch is chosen to provide efficient mode conversion. FIG. 6A illustrates a waveguide having a gap 620 between the main branch of the waveguide 612 and the secondary branch of the waveguide 614. The gap 620 may be adjusted in various ways. For example, the gap 620 may be changed by changing the width (w) 657 of the main branch and/or changing $w_{b1}$ 630. The width of either of these two portions may be changed for a portion of their length, for the whole length, and/or may be variable along the length. In some cases, the gap 620 may have a constant width 622 for a predetermined length. In the case of FIG. 6A, the gap 620 has a constant width for a length ($m_b$) 650 of about 5.75 µm.

The width 622 of the gap 620 may have an impact on the efficiency of mode conversion.

Figure 6B:
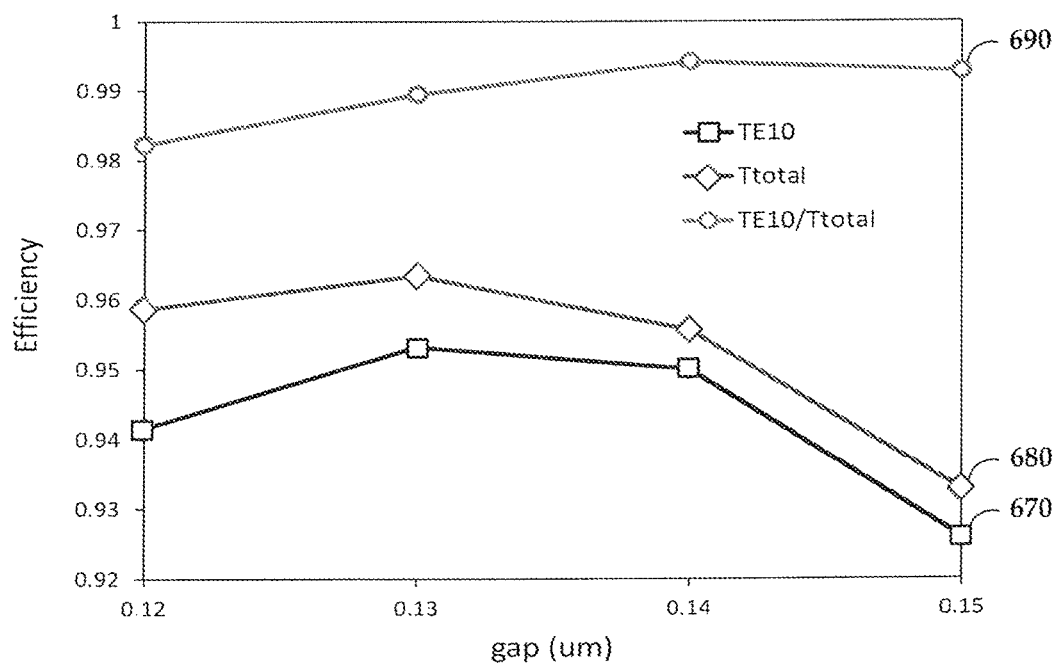
FIG. 6B illustrates the efficiency of mode conversion from $TE_{00}$ to $TE_{10}$ versus the gap width in accordance with embodiments described herein.

FIG. 6B illustrates the efficiency of mode conversion from $TE_{00}$ to $TE_{10}$ versus the gap width 622. FIG. 6B shows the efficiency for $TE_{10}$ 670, the power transmission efficiency (Ttotal) 680, and $TE_{10}$/Ttotal 690. The gap width 622 may be chosen to be about 0.14 µm. According to various configurations, the gap width 622 is selected to be in the range of about 0.13 µm to about 0.15 µm.

Figure 7A:
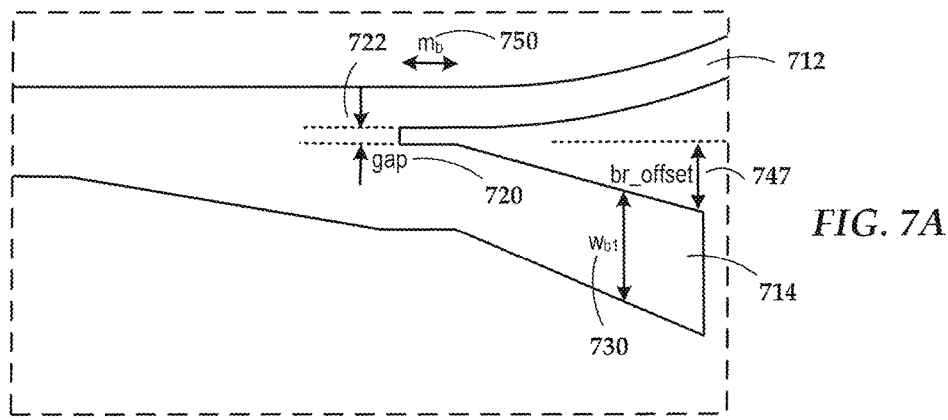
FIG. 7A illustrates an example in which the gap is constant for a length ($m_b$) and then the secondary branch is offset from the main waveguide creating a tapered gap.

According to various embodiments, the width of the gap may change along the length of the waveguide. For example, the gap may include an increasing and/or decreasing taper as the gap approaches the combined waveguide. For example, the gap may have a linear taper that decreases as it approaches the combined waveguide. In some cases, the gap may have a nonlinear taper. For example, the gap may include a curve. In some implementations, the width of the gap may be provided such as to provide a combination of tapered and constant widths. FIG. 7A illustrates an example in which the gap 720 has a constant width 722 for a length ($m_b$) 750 and the secondary branch 714 is offset from the main branch 712 creating a tapered gap 720. The branch offset 747 is variable along the length of the waveguide. Substantially immediately after the constant gap width portion, the branch is offset at an angle in the range of about −7 degrees to about 7 degrees. In the example shown in FIG. 7A the width 730 of the secondary branch 714 of the waveguide is about 800 nm and does not change along the length of the secondary branch 714.

Figure 7B:
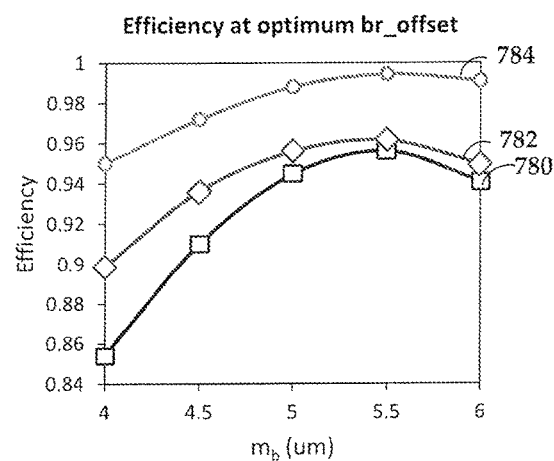
FIG. 7B shows the efficiency of mode conversion versus $m_b$ according to various embodiments.
Figure 7C:
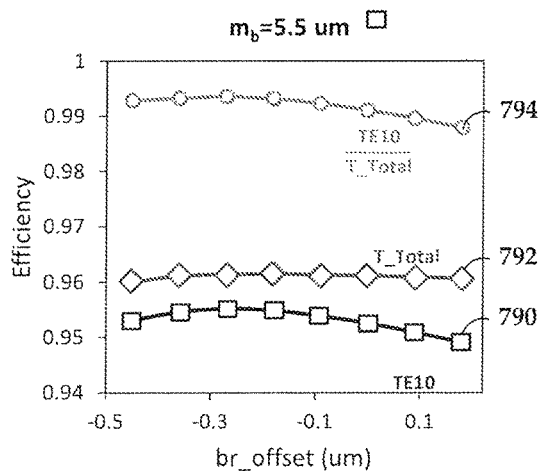
FIG. 7C shows the efficiency versus the branch offset for a constant gap length in accordance with various embodiments described herein.
Figure 7D:
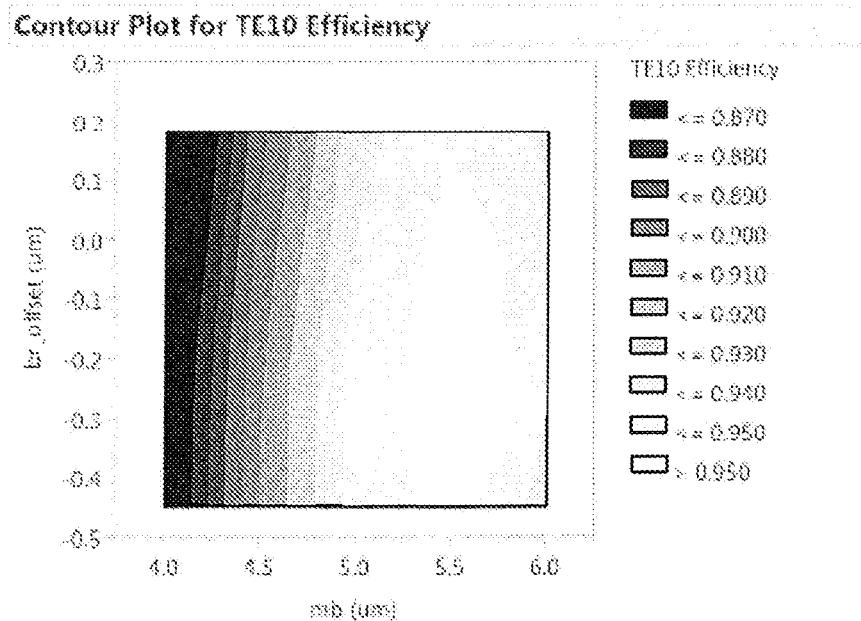
FIGS. 7D and 7E are contour plots for showing the branch offset versus the constant gap length in accordance with various embodiments described herein.
Figure 7E:
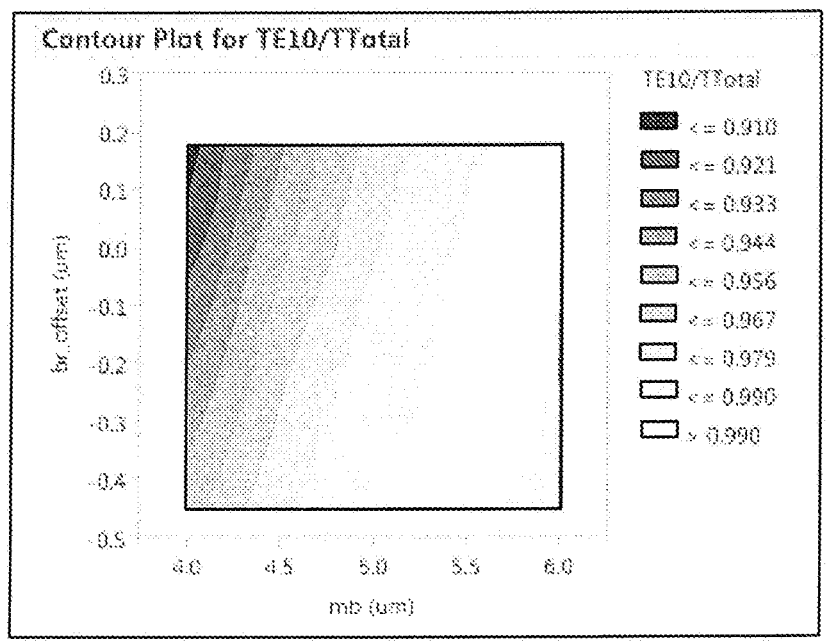
Figure 7F:
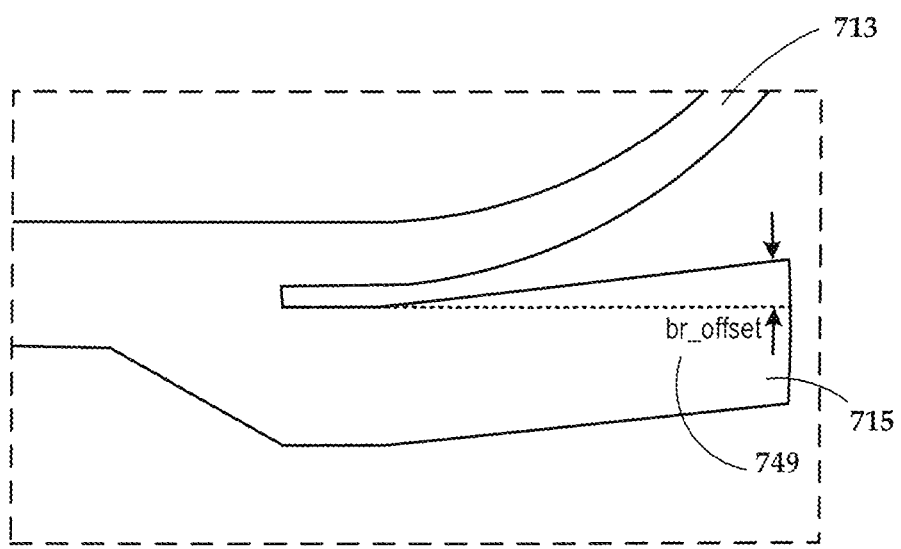
FIG. 7F shows an example in which the waveguide has a positive branch offset in accordance with various embodiments described herein.

The mode conversion efficiency may change depending on the value of $m_b$ 750. FIG. 7B shows the efficiency of conversion versus $m_b$ 750 for $TE_{10}$ 780, Ttotal 782, and $TE_{10}$/Ttotal 784. In some cases, $m_b$ is chosen to be about 5.5 µm. According to various configurations, $m_b$ is in a range of about 5 µm to about 6 &m. In some cases, $m_b$ is about 5.5 µm. FIG. 7C shows the efficiency (TE 790, Ttotal 792, and $TE_{10}$/Ttoal 794) versus the branch offset 747 for a constant $m_b$ value of about 5.5 µm. The branch offset 747 may be chosen to be about −0.3 µm, for example. In some cases, the branch offset is chosen to be in a range of about −0.5 µm to about to about −0.1 µm or in the range of about −0.5 µm to about −0.2 µm. According to various implementations, the branch offset 747 is chosen to be about −0.3 µm. FIGS. 7D and 7E are contour plots showing the branch offset 747 versus $m_b$ 750. The most efficient $TE_{00}$ to $TE_{10}$ conversion is centered around a branch offset of about −0.3 and a $m_b$ of about 5.5 µm. According to various implementations, the branch offset may have a positive value. FIG. 7F shows an example in which the waveguide has a main branch 713 and a secondary branch 715 having a positive branch offset 749. Substantially immediately after the constant gap width portion, the branch is offset at an angle of about 1 degree.

Figure 8A:
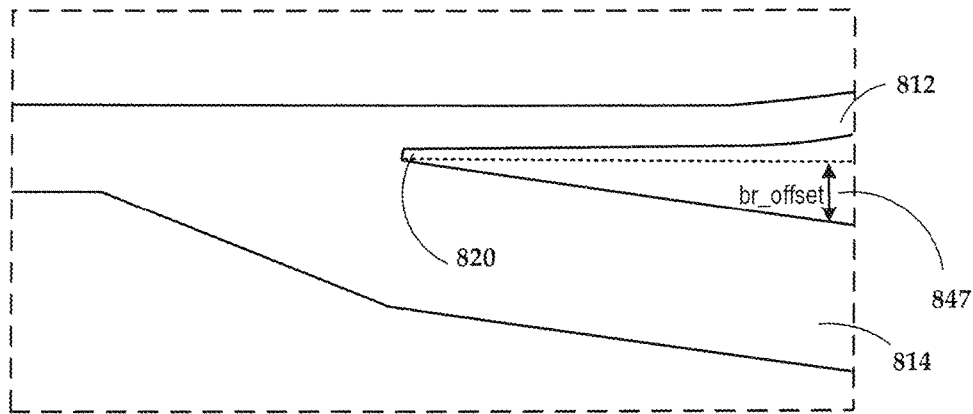
FIG. 8A illustrates a waveguide in which the gap has a linear taper until the main branch and the secondary branch are combined in accordance with various implementations.
Figure 8B:
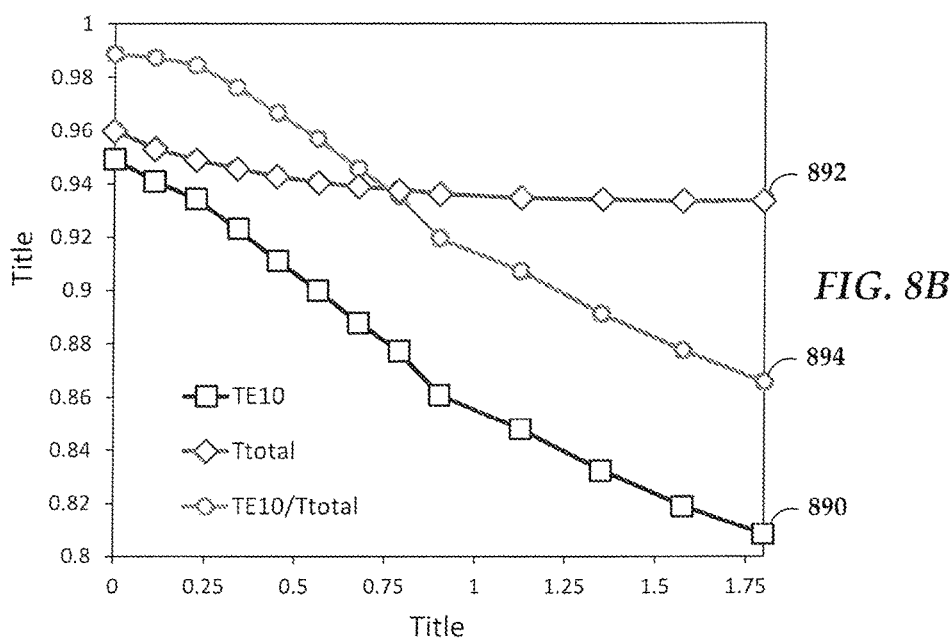
FIG. 8B shows the efficiency of mode conversion versus the branch offset according to some aspects.

In some cases, the gap may have a taper up until the combined waveguide. In this case, the waveguide may not have a section with a constant gap width as shown in previous figures. FIG. 8A illustrates a waveguide in which the secondary branch 814 has a linear taper until the main branch 812 and the secondary branch 814 are combined. The branch offset 847 is linearly variable along the length of the waveguide. In the example shown in FIG. 8A, there is no constant gap width portion and thus, the gap offset starts from the combination of the main branch 812 and the secondary branch 814. The angle at which the branch is offset may be in a range of about −7 degrees to 7 degrees. FIG. 8B shows the efficiency of conversion versus the branch offset 847 for $TE_{10}$ 890, Ttotal 892, and $TE_{10}$/Ttotal 894. According to various implementations, the branch offset 847 may be chosen to be in an range of about 0 to 0.25 µm, or in a range of about 0-0.12 µm, for example. In some cases, the branch offset 847 is about 0 degrees. While FIGS. 7A-8B illustrate a branch offset that is substantially linearly variable along the length, it is to be understood that the branch offset may be nonlinear.

Figure 9A:
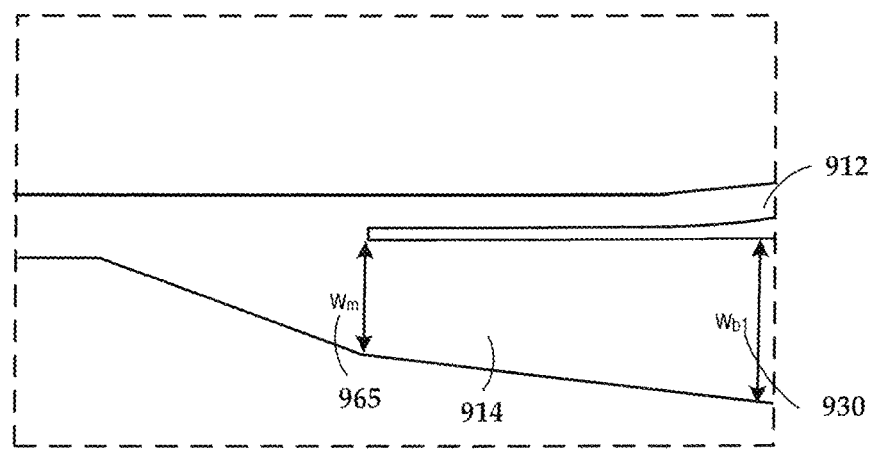
FIG. 9A illustrates a waveguide in which the width of the secondary branch varies along the length of the branch and the width of the main branch remains substantially constant in accordance with various embodiments.
Figure 9B:
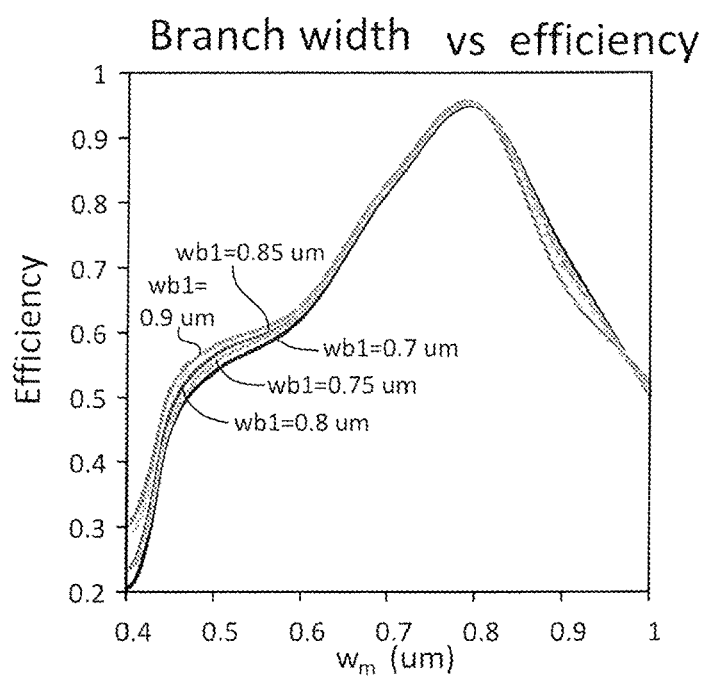
FIGS. 9B and 9C show the efficiency versus the width of the secondary branch in accordance with various embodiments described herein.
Figure 9C:
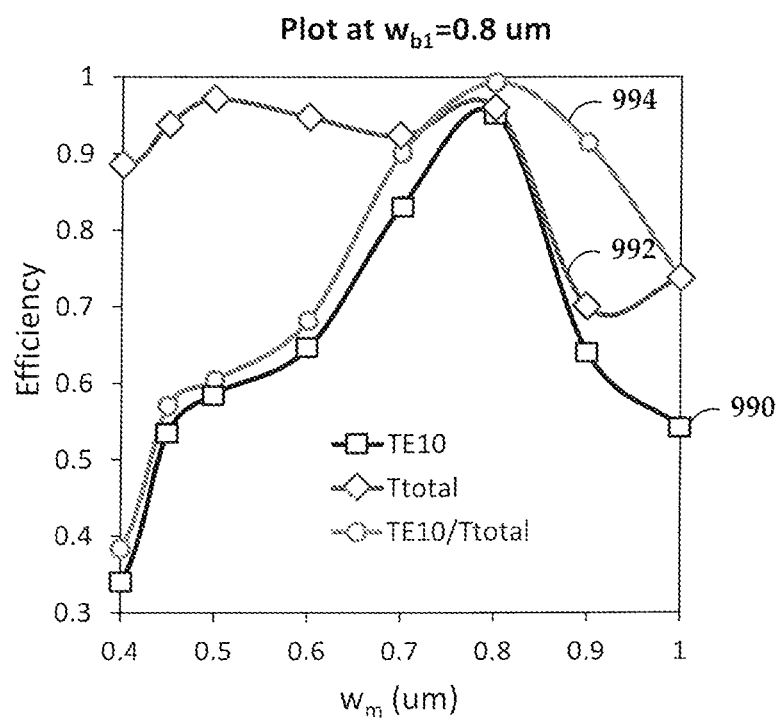

The width of one or both of the main branch and the secondary branch may vary along the length of the respective branch. FIGS. 9A-9C illustrate examples of a waveguide in which the width of the secondary branch 914 varies along the length of the branch 914 and the width of the main branch 912 remains substantially constant. The width of the secondary branch 914 at the combination region ($w_m$) 965 is different than the width of the width further away from the combination region ($w_{b1}$) 930. The width of the secondary branch 914 may change linearly or nonlinearly.

FIG. 9B illustrates the efficiency of mode conversion versus $w_m$ 965 at the combination region at varying $w_{b1}$ 930 values. As shown, the most efficient $w_m$ 965 is about 0.8 µm for all $w_{b1}$ 930 values for the secondary branch 914. FIG. 9C shows the efficiency ($TE_{10}$ 990, Ttotal 992, and $TE_{10}$/Ttotal 994) versus $w_m$ for a constant $w_{b1}$ 930 of about 0.8 µm. According to various implementations, $w_m$ 965 and $w_{b1}$ 930 are both chosen to be about 0.8 µm.

Figure 10A:
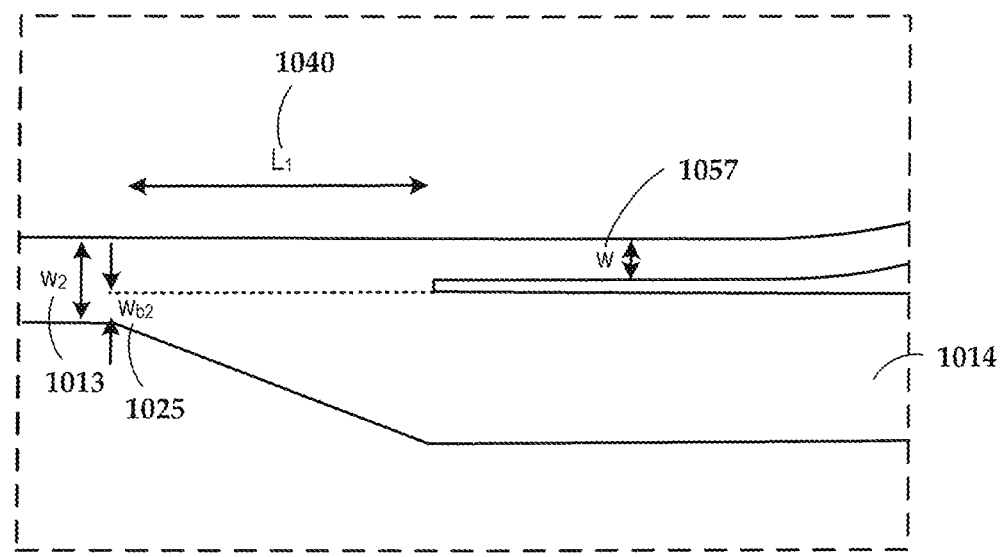
FIG. 10A illustrates a waveguide having a combined width ($w_2$) in accordance with various embodiments described herein.
Figure 10B:
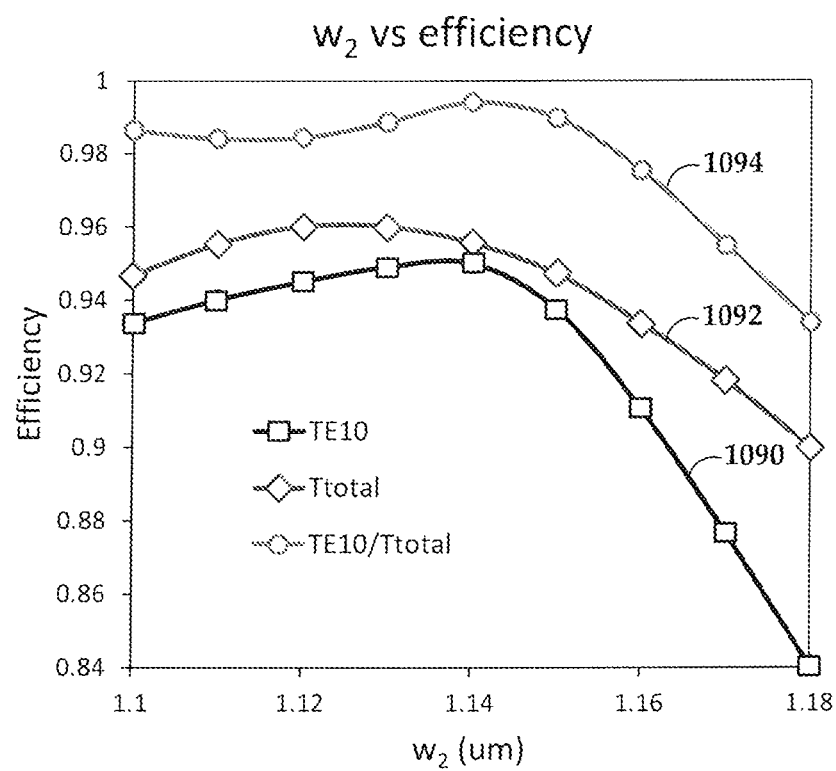
FIG. 10B illustrates the efficiency versus the combined width in accordance with various embodiments described herein.

As described previously, the secondary branch may include a taper that starts at the point where the waveguide branches are combined and continues to taper substantially linearly to reach the final waveguide width ($w_2$). FIG. 10A that may utilize different $w_2$ 1013 values in accordance with embodiments described herein. The value of $w_2$ 1013 may vary depending on the rate of taper of the secondary branch 1014, the length of the taper 1040 and/or a combination of the combination of the rate and the length 1040. FIG. 10B shows the efficiency ($TE_{10}$ 1090, Ttotal 1092, and $TE_{10}$/Ttotal 1094) versus $w_2$ 1013 for a $w_{b2}$ 1025 of about 0.45 µm. In some cases, $w_2$ 1013 is about 1.14 µm.

Figure 11:
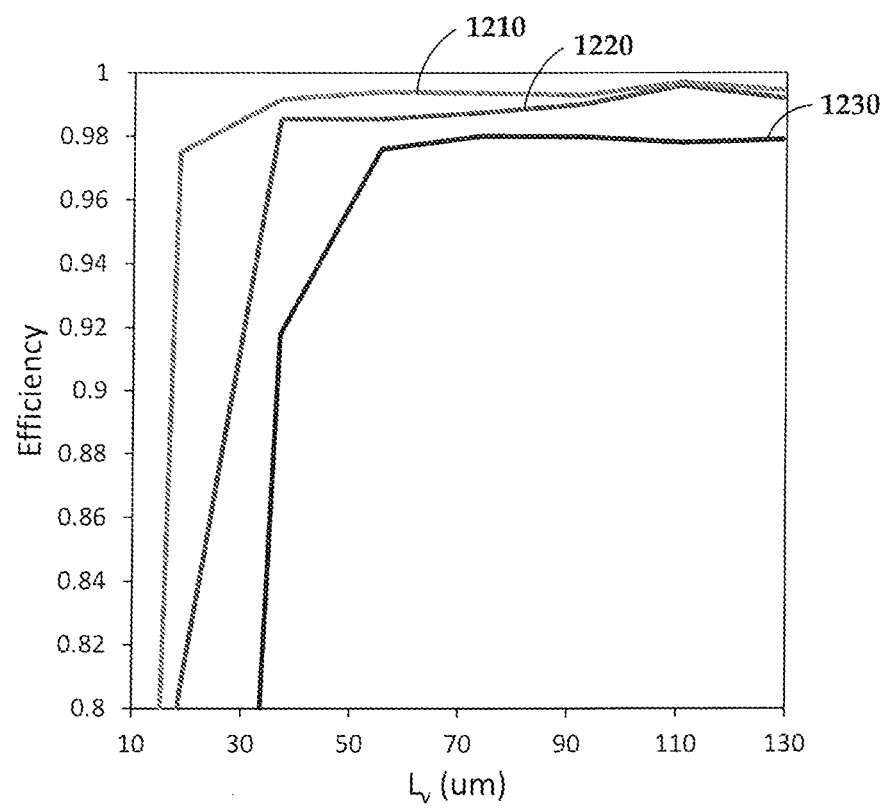
FIG. 11 illustrates the mode conversion in an Euler waveguide using different waveguide core materials in accordance with various embodiments described herein.

FIG. 11 illustrates the mode conversion in a Euler waveguide using different waveguide core materials. Using a waveguide core comprising BTO having a width of about 545 nm, a height of about 110 nm, and an index of refraction of about 2.45 an over 99% conversion from $TE_{10}$ to $TE_{00}$ can be obtained as shown by line 1210. A core comprising NbOx having a width of about 550 nm, a height of about 120 nm, and an index of refraction of about 2.28 may has an efficiency of about 99% as shown by line 1220. A core comprising TaOx having a width of about 650 nm, a height of about 140 nm, and an index of refraction of about 2.08 may has an efficiency of about 98% as shown by line 1230.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A write head comprising:
a waveguide core configured to receive light emitted in a crosstrack direction from a light source at a fundamental transverse electric ($TE_{00}$) mode, the waveguide core comprising:
  a first turn that receives the light in the crosstrack direction from the light source and redirects the light to an opposite crosstrack direction;
  a second turn, positioned closer to a media-facing surface than the first turn, that redirects the light from the opposite crosstrack direction to a direction normal to the media-facing surface of the write head;
  a straight section coupling the first and second turns; and
  a branched portion extending from the straight section and configured to convert the light to a higher-order ($TE_{10}$) mode; and
a near-field transducer at the media-facing surface, the near-field transducer receiving the light at the $TE_{10}$ mode from the waveguide and directing surface plasmons to a recording medium in response thereto, the second turn configured to deliver the light to the near-field transducer at the direction normal to the media-facing surface.

2. The write head of claim 1, wherein the first turn comprises first and second mirror image Euler spiral sections.

3. The write head of claim 2, wherein the second turn comprises third and fourth Euler spiral sections.

4. The write head of claim 1, wherein the straight section tapers from a first cross-sectional width at the first turn to a second cross-sectional width at the second turn, the first cross-sectional width being less than the second cross-sectional width.

5. The write head of claim 1, wherein the branched portion is separated from at least part of the straight section via a gap having a constant cross-sectional width for a predetermined length.

6. The write head of claim 5, wherein the predetermined length is in a range of about 5 µm to about 6 µm.

7. The write head of claim 5, wherein the gap has a variable cross-sectional width.

8. The write head of claim 5, wherein at least a portion of the gap has a linear taper.

9. The write head of claim 5, wherein the straight section and the branched portion combine to form a combined width of about 1.14 µm.

10. The write head of claim 9, wherein one or both of the straight section and the branched portion has a taper to accommodate the difference in the combined width.

11. The write head of claim 10, wherein the taper has a length of about 23 µm.

12. The write head of claim 1, wherein the branched portion has an offset from a centerline of about −0.3 µm.

13. The write head of claim 1, wherein the branched portion tapers from a narrower width proximate the middle section to a wider width away from the straight section.

14. The write head of claim 1, wherein the light source comprises an active region formed of a non-self supporting, crystalline layer transfer printed to a substrate of the write head.

15. A system, comprising:
a light source comprising an active region formed of a non-self supporting, crystalline layer transfer printed to a substrate;
an input coupler configured to receive light excited by the light source;
a waveguide core extending along a light-propagation direction and configured to receive light from the light source at a fundamental transverse electric ($TE_{00}$) mode, the waveguide core comprising:
  a main portion having a curvature that changes linearly with curve length and configured to receive light at an input, and
  a branched portion extending from a middle region of the main portion; and
a near-field transducer at a media-facing surface of the write head, the near-field transducer receiving the light at a $TE_{10}$ mode from the waveguide and directing surface plasmons to a recording medium in response thereto, the main portion configured to deliver the light to the near-field transducer at a direction normal to the media-facing surface.

16. The system of claim 15, further comprising a mode converter that converts the light to the $TE_{10}$ mode.

17. The system of claim 15, wherein the middle region tapers from a first cross-sectional width to a second cross-sectional width along the light propagation direction, the first cross-sectional width being greater than the second cross-sectional width.

18. The system of claim 15, wherein the branch of the waveguide is separated from the waveguide via a gap.

19. The system of claim 18, wherein the gap has a constant cross-sectional width for a predetermined length.

20. A method comprising:
receiving light emitted in a crosstrack direction from a light source at a fundamental transverse electric ($TE_{00}$) mode;
redirecting the light to an opposite crosstrack direction into a straight section of a waveguide via a first turn of the waveguide;
converting light to a higher-order ($TE_{10}$) mode via a branched portion that extends from the straight section of the waveguide;
redirecting the light to a direction normal to a media-facing surface of the write head via a second turn of the waveguide, the second turn coupled to the straight section;
coupling the light in the $TE_{10}$ mode to a near-field transducer at the media-facing surface, the near-field transducer directing surface plasmons to a recording medium in response thereto; and
delivering the light to the near-field transducer at the direction normal to the media-facing surface.

* * * * *